United States Patent [19]

Yoshida et al.

[11] Patent Number: 4,913,523
[45] Date of Patent: Apr. 3, 1990

[54] OPTICAL FIBER CONNECTOR
[75] Inventors: Noriyuki Yoshida; Kenichi Takahashi, both of Osaka, Japan
[73] Assignee: Sumitomo Electric Industries, Ltd., Osaka, Japan
[21] Appl. No.: 212,531
[22] Filed: Jun. 28, 1988

Related U.S. Application Data

[63] Continuation-in-part of Ser. No. 856,985, Apr. 29, 1986, abandoned.

[30] Foreign Application Priority Data

May 9, 1985 [JP] Japan .................................. 60-98600

[51] Int. Cl.$^4$ ................................................ G02B 6/36
[52] U.S. Cl. .................................................. 350/96.20
[58] Field of Search ................ 350/96.20, 96.21, 96.22

[56] References Cited

U.S. PATENT DOCUMENTS

| | | | |
|---|---|---|---|
| 4,087,155 | 5/1978 | Deacon | 350/96.21 |
| 4,178,068 | 12/1979 | Hoover | 350/96.21 |
| 4,327,964 | 5/1982 | Haesly et al. | 350/96.20 |
| 4,744,630 | 5/1988 | Hipple et al. | 350/96.20 |

FOREIGN PATENT DOCUMENTS 1186537 5/1985 Canada .
0021871 5/1980 European Pat. Off. .

OTHER PUBLICATIONS

Tenth European Conference on Optical Communication, Sep., 1984, article on MULTIMODE MECHANICAL SPLICES by Aberson, pp. 182-183.
Patent Abstracts of Japan, vol. 1, No. 72, 7/13/77, pp. 779 E77; JP-A-52 9450 (FUJITSU K.K.), 1/25/77, whole document.

Primary Examiner—John D. Lee
Attorney, Agent, or Firm—Cushman, Darby & Cushman

[57] ABSTRACT

An optical fiber connector comprises a sleeve and a receptacle. The sleeve has a front cylindrical surface and a rear conical surface formed in coaxial relation with the front cylindrical surface. The receptacle has an inner cylindrical surface and an inner conical surface formed in coaxial relation with the inner cylindrical surface. In coupling state the front cylindrical surface of the sleeve fits in the inner cylindrical surface of the receptacle, and the rear conical surface of the sleeve fits in the inner conical surface of the receptacle. The conical surfaces forbid radial displacements of the sleeve. The cylindrical surfaces determine the locations of the centers.

2 Claims, 4 Drawing Sheets

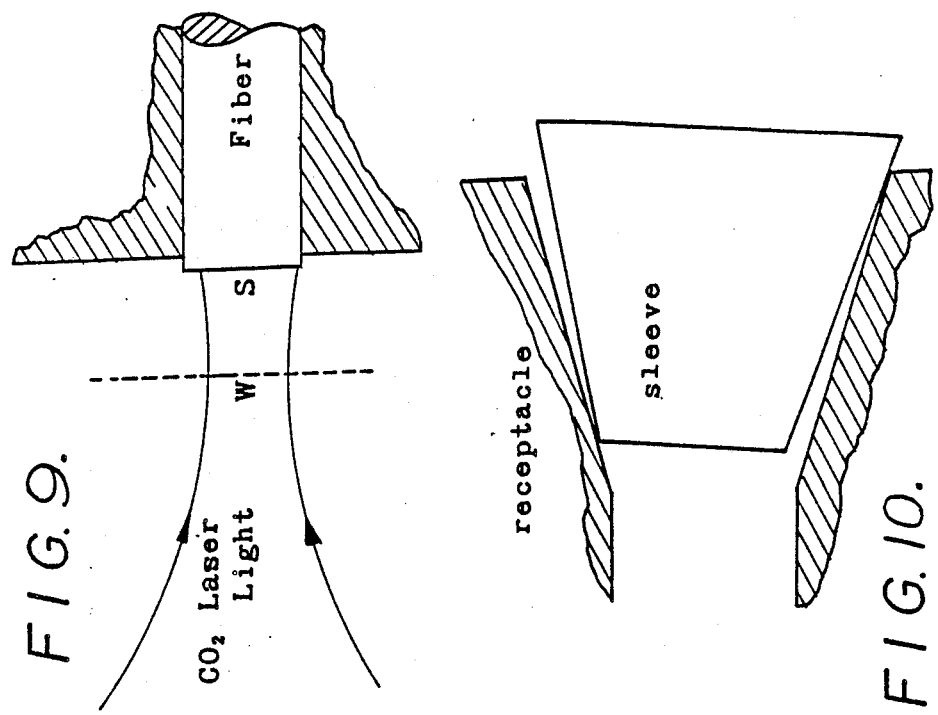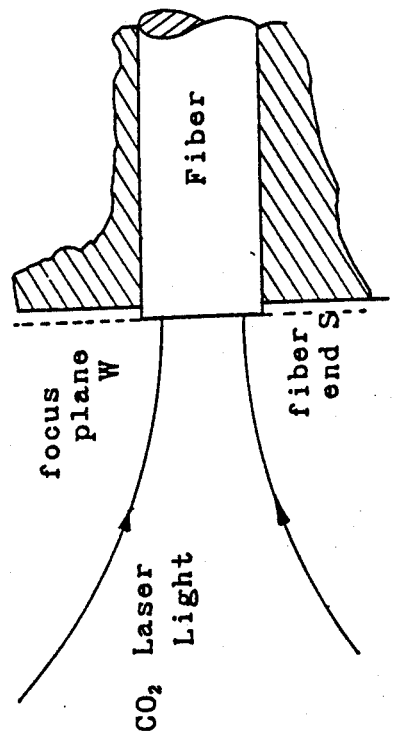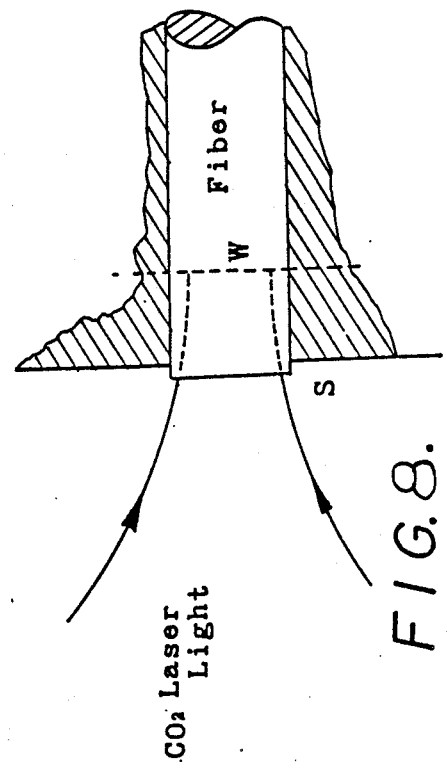

OPTICAL FIBER CONNECTOR

This is a continuation-in-part of Ser. No. 856,985 filed 4-29-86, (now abandoned). This invention relates to an improvement of an optical fiber connector.

BACKGROUND OF THE INVENTION

Optical fiber connectors are used either to connect an optical fiber with another optical fiber or to connect an optical fiber with a positive optical device e.g. light-emitting device or photo-detecting device.

In this invention, optical fibers signify such fibers through which infrared lights e.g. the light of a $CO_2$ laser can propagate with low loss.

Thus the term optical fiber in this invention does not mean the conventional fibers e.g. fused glass fibers which enable us to transmit visible light (wavelength 0.4–0.75 $\mu$m) or near infrared light (wavelength 0.75–2.5 $\mu$m).

These conventional optical fibers are generally used to transmit optical, digital or analog signals. The optical fibers are long, light and fine. Typically these optical fibers are a hundred meters to tens of kilometers. The cladding diameter is typically 0.1 mm. They have a core-clad structure. The core is a central portion in which a light beam transmits. The clad is a peripheral portion which encloses the core portion. The refractive index of the core is slightly larger than that of the clad. Although both the core and the clad are transparent to the transmitting light, the light transmits mainly through the core because of the difference in the refractive indices.

However, the optical fibers in this invention transmit the power of infrared light instead of signals. Specifically, the optical fibers can be used to transmit the light of $CO_2$ lasers or radiation thermometers. A radiation thermometer detects temperature of an object by measuring the power of infrared light emitted by the object. The power spectrum of the emitted lights depend on the temperature of the object.

$CO_2$ lasers can emit strong infrared light beams with high efficiency. The wavelength of the $CO_2$ laser light is 10.6 $\mu$m in a usual case with a very large light power.

The fused silica fiber or the plastic fiber cannot transmit $CO_2$ laser light. Various kinds of optical fibers for $CO_2$ laser light transmission have been proposed. Some of them are glassy fibers. Another are crystalline fibers. Glass fibers are made of chalcogenide glass e.g. As-S glass or As-Se glass, or monoelement glass e.g. Ge glass. However, proposed glassy fibers for $CO_2$ laser light are generally very difficult to manufacture.

More prospective fibers are crystalline fibers. The following crystalline fibers are known now:

(1) Thallium Halides TlI, TlBR, TlCl and mixture crystals of them
(2) Silver Halides AgI, AgBr, AgCl and mixtures of them
(3) Alkali Halides CsI, CsBr, etc.

The optical fibers for $CO_2$ laser light transmission are generally short, and thick. The length is typically 1 m to 3 m and the diameter is typically 0.6 mm to 1.0 mm. Most of the optical fibers have no core-clad structure. They lack a clad portion in general.

The characteristics required for optical fiber connectors are a possibility of coupling and decoupling, a small connection loss, and easy handling.

The connection loss mainly originates from incorrect locations of optical fibers in optical fiber connectors. Due to the incorrect locations when two optical fiber connectors are coupled, the centers of optical fibers become discrepant with each other. Because the diameter of the fiber core is small, even a slight discrepancy in the fiber centers causes a great connection loss.

FIG. 4 shows a sectional view of a conventional optical fiber connector for $CO_2$ laser light.

At a front end of an optical fiber (21), a cylindrical sleeve (22) is fitted coaxially. The outer surface of the sleeve (22) has been fishished to a cylindrical surface with high accuracy. The sleeve (22) is inserted and fixed in a receptacle (23) having an inner cylindrical surface finished with high accuracy.

The longer the contact length is, the more accurately the center of the sleeve (22) coincides with the center of the receptacle (23).

The narrower the clearance between the outer cylindrical surface of the sleeve (22) and the inner cylindrical surface of the receptacle (23) is, the smaller the vibration of the center of the sleeve (22) in the direction vertical to the axial direction becomes.

However due to the restriction of accuracy of finishing, the clearance between the outer cylindrical surface and the inner cylindrical surface cannot be extinguished completely. Furthermore probable incorrectness of cylindrical surfaces of the receptacle and the sleeve forbids the clearance therebetween from extinguishing completely.

These size errors cause a large energy loss of light at the connecting portion. The large energy loss is a problem for conventional optical fiber connections.

In addition, the energy loss is not a constant value but randomly-dispersed values.

The energy of light transmitting in optical fibers is dissipated at the connecting portion. Because the energy loss is not constant, the connectors cannot be a part of accurate measuring devices, for example a radiation thermometer.

The energy loss at the connection portion causes a serious difficulty in the high power transmission of light. The power of the light emitted from a strong $CO_2$ laser is very strong. Thus the energy loss at the connecting portion is also strong. The heat generated by the energy loss of laser light may burn and impair the ends of the fibers at the connecting portion.

When there are some size errors in the cylindrical surfaces, some clearances must exist between the sleeve and the receptacle. If not, the sleeve cannot be inserted into the receptacle. Thus some clearance should be required between the sleeve and the receptacle.

However the existence of the clearance makes the location of the sleeve difficult, because the sleeve displaces in radial directions in the receptacle.

When an external force acts upon a portion of the connector or the optical fiber, the sleeve displaces in radial direction owing to the external force. The radial displacement of the sleeve changes the relative positions of the fiber centers which are facing together in the connector. Thus the radial displacements change the connecting loss.

This fluctuation of the connecting loss induces a serious difficulty, because it is caused in a same connector by external forces.

The difficulty of radial displacement of sleeve owing to the clearances cannot be solved so long as we employ the cylindrical surface type of optical fiber connectors.

Then it may be more prospective to adopt conical surface fitting for optical fiber connectors. Here the conical surface fitting means the assembly of the receptacle with an inner conical surface and the sleeve with an outer conical surface.

So long as the top angles of the conical surfaces are common, the sleeve will fit well in the receptacle. If the sleeve is pushed strongly against the receptacle, no radial displacement of the sleeve will occur.

However the cutting of conical surfaces is more difficult than the cutting of cylindrical ones. The size errors of the cutting of conical surfaces are considerably large.

Along a center line of the cone, a small hole through which an optical fiber passes must be perforated. However this perforation is more difficult than the perforation of a hole along a center line of a cylinder. Thus the error of the center of a hole perforated in a cone is large. Furthermore all longitudinal surface lines cannot be correct straight lines. They have concave portions and convex portions more or less.

Therefore if a sleeve and a receptacle were conical, random radial displacement would be forebidden, but the centers of them might deviate in radial directions or the center lines of them might deviate from the parallel relation.

Conical sleeves and receptacles are now only imaginary matters. So long as the Inventors know no conical sleeve nor conical receptacle for optical fibers which transmit infrared light have been manufactured till now.

Thus conventional cylindrical sleeve and receptacles as well as imaginary conical sleeves and receptacles have inherent drawbacks.

SUMMARY OF THE INVENTION

A purpose of the invention is to provide an optical fiber connector in which the centers of sleeve and receptacle exactly coincide with each other.

Another purpose of the invention is to provide an optical fiber connector with low connection loss.

Yet another purpose of the invention is to provide an optical fiber connector in which radial displacements of a sleeve are non occurring.

The optical fiber connector of this invention employs both conical surfaces and cylindrical surfaces.

A sleeve has a cylindrical forehead and a conical backend in coaxial relation with the forehead. In accordance with the sleeve, a receptacle has a front part with a conical inner surface and a rear part with a cylindrical inner surface in coaxial relation with the conical surface.

BRIEF DESCRIPTION OF THE DRAWINGS

FIG. 7 is a side view of a fiber showing the optimum location for laser light.

FIG. 8 shows a side view of a fiber in which the laser light is defocused.

FIG. 9 shows a side view of a fiber in which the laser light is defocused.

FIG. 10 shows a side view of a sleeve which is angularly misaligned.

DETAILED DESCRIPTION OF THE INVENTION

Figure 3:
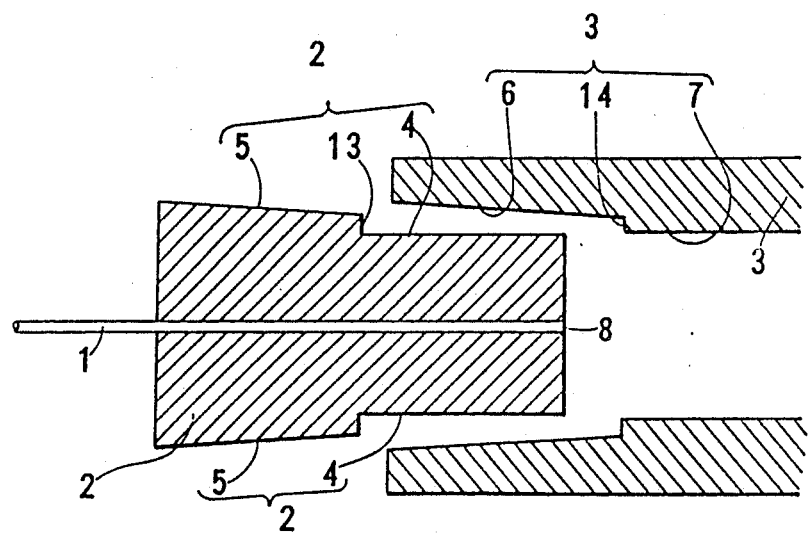
FIG. 3 is a typical sectional view of a receptacle and a sleeve of an optical fiber connector of the invention in decoupling state.
Figure 4:
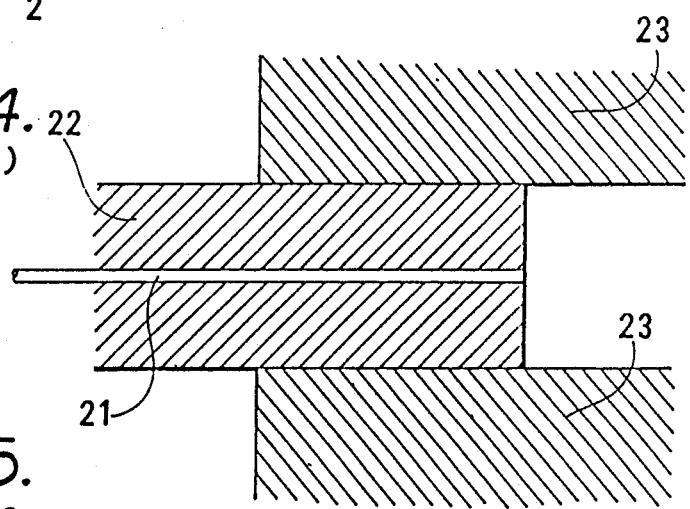
FIG. 4 is a sectional view of a receptacle and a sleeve of a conventional optical fiber connector.

A typical optical fiber connector of this invention is shown by FIG. 3.

At an end of an optical fiber (1), a sleeve (2) is fitted. The optical fiber (1) can transmit a strong infrared light radiated from a $CO_2$ laser or infrared light radiated from an object to a radiation thermometer. The optical fiber (1) is either of thallium halide crystals, alkali halide crystals, silver halide crystals etc. The optical fiber (1) may have either a simple core structure without clad or a core-clad structure.

The sleeve (2) has a front cylindrical surface (4) at the front half and a rear conical surface (5) at the back half. Both surfaces (4) and (5) which have been finished with high accuracy are in coaxial relation.

Here a cylindrical surface is defined as a surface whose sections are circles with the same diameter along an axial line and whose longitudinal surface lines are parallel with the axial line. Thus the axial line is a locus of the centers of the circles sectioned. A cylindrical surface has a rotational symmetry around the axial line.

A conical surface is defined as a surface whose sections are circles with linearly-changing diameters along an axial line.

The axial line is a locus of the centers of the circles sectioned vertical to the axial line. A conical surface has a rotational symmetry around the axial line. Extensions of the longitudinal surface lines meet together at a common point on the axial line.

In accordance with the shape of the sleeve (2), a receptacle (3) has an inner conical surface (6) at an opening end and an inner cylindrical surface (7) at the middle part. The inner conical surface (6) and cylindrical surface (7) have been finished with high accuracy.

Two inner surfaces (6) and (7) are in coaxial relation.

In coupling state the front cylindrical surface (4) fits in the inner cylindrical surface (7) of the receptacle (3). At the same time the rear conical surface (5) of the sleeve (2) fits in the inner conical surface (6) of the receptacles (3).

In order to make such coupling possible, the front cylindrical surface (4) of the sleeve (2) and the inner cylindrical surface (7) of the receptacle must have nearly same diameters with slight tolerance. The surfaces (4) and (7) must be cylindrical surfaces whose longitudinal surface lines are parallel with the axial line.

In order to fit the rear conical surface (5) of the sleeve (2) with the inner conical surface (6) of the receptacle (3) without clearances, both surfaces (5) and (6) must be conical surfaces whose top angles are common. Further it is also important to finish the conical surfaces (5) and (6) without eccentricity and perforate an optical fiber hole (8) exactly along a center line of the sleeve (2).

Besides, the longitudinal surface lines of the cones must be cut as exact straight lines all of which cross the center line at a common cross point.

In this example the sleeve (2) has a step part (13) at the cone-cylinder boundary. The receptacle has a step part (14) at the cone-cylinder boundary.

Figure 1:
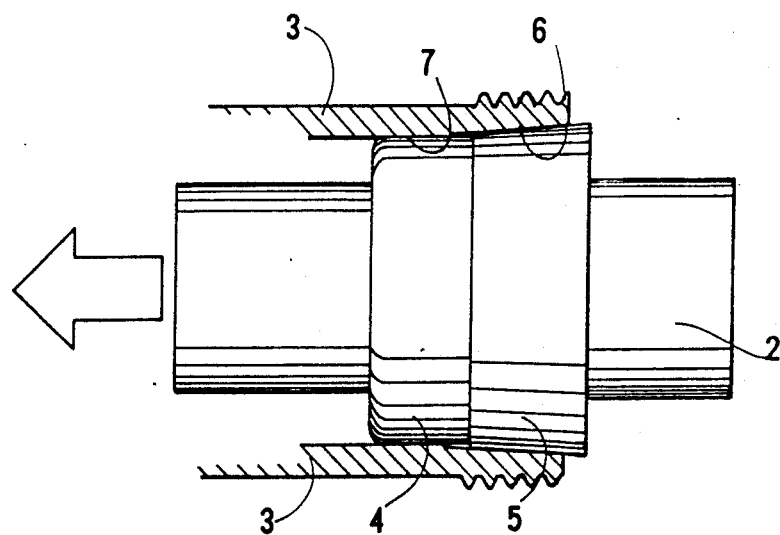
FIG. 1 is a partially sectioned view of a receptacle and a sleeve of and embodiment of the invention in coupling state.

Both step parts (13) and (14) cooperate to couple tightly the conical surfaces (5) and (6) in coupling state as shown in FIG. 1. For this purpose the height of the step part (13) of the sleeve (2) must be larger than that of the step part (14) of the receptacle (3).

In usual cases the heights of the step parts (13) and (14) are less than about 1 mm. The step part (14) of the receptacle (3) can be omitted.

Instead of the step parts, a circular groove cut around a sleeve at the cone-cylinder boundary would be available.

In coupling state, if the sleeve (2) is pushed forward into the receptacle (3) in full length, the front cylindrical surface (4) of the sleeve (2) and the inner cylindrical surface (7) of the receptacle (3) cooperates to adjust the center of the optical fiber with the center of the receptacle (3). Thus the cylindrical surfaces (4) and (7) play a role of center-adjustment.

On the other hand, the rear conical surface (5) of the sleeve (2) and the inner conical surface (6) of the receptacle (3) press each other with strong radial forces in antiparallel directions. Then the sleeve (2) does not displace in radial directions, even if external forces act upon the sleeve (2) or the optical fiber. The center of the optical fiber does not displace in radial directions.

The conical surfaces (5) and (6) cooperate to kill radial displacements of optical fiber.

No external shocks nor external vibrations acting on the connector can change the connection loss. The connection loss is kept to be constant by the cooperation of the conical surfaces (5) and (6).

In general in a coupling consisting of a male part and a female part, the male part has a conical front and a cylindrical rear in many cases. But in the sleeve and the receptacle of this invention, the relation between conical surfaces and cylindrical surfaces is completely reversed.

Figure 2:
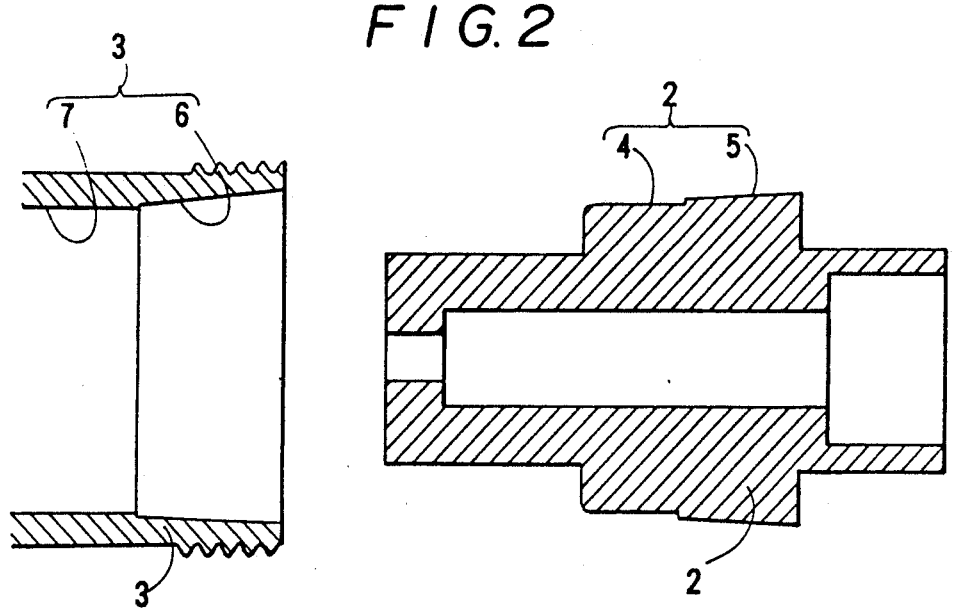
FIG. 2 is a sectional view of a receptacle and a sleeve of the embodiment shown in FIG. 1 in a decoupled state.

FIG. 1 shows an embodiment of the invention in coupling state. FIG. 2 shows it in decoupling state.

The shape of forefront of the receptacle has many variations according to its purpose. Thus the forefront of the receptacle is omitted in the figures.

In this example the inner cylindrical surface (7) of the receptacle (3) is 25 mm in inner diameter. The inner conical surface (6) of the receptacle (3) is 12 mm in longitudinal length. The oblique rate, or the quotient of the increment of radius divided by the longitudinal distance, of the inner conical surface with regard to the axial line is ⅛–1/80, preferably ⅛. Namely half of the top angle of the conical surface is 7.120 degrees.

Figure 5:
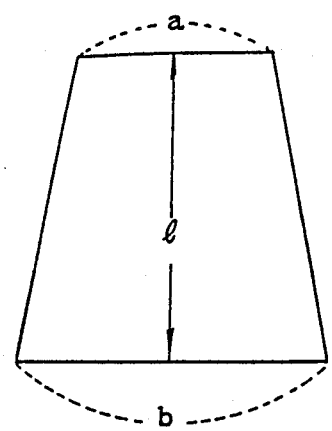
FIG. 5 is a front view of a trapazoid showing the definition of the oblique rate.

FIG. 5 shows the definition of the oblique rate. The trapezoid corresponds to the conical surfaces 6.5 of the receptacle 3 or sleeve 2, respectively of the connector. "a" is the shortest diameter at one end. "b" is the longest diameter at the other end. "l" is the length. "$\theta$" is the inclination angle, and half of top angle of the conical surface. "$2\theta$" is the top angle. The oblique rate is defined by:

$$\frac{b-a}{2l}$$

The oblique rate of the conical surfaces is from ⅛ to 1/80.

The same restriction can be defined by the inclination angle $\theta$, because the oblique rate is given by oblique rate = tan $\theta$ The inclination angle $\theta$ must be from 0.72° to 7.12°, because tan 0.72° = 1/80 tan 7.12° = ⅛

The inventors have investigated the relationship between the damage occurrence and the inclination. The laser is a $CO_2$ laser of 50 Watt output. The wavelength is 10.6 $\mu$m. The fiber is silver halide (AgBr).

Ten connectors with different oblique rates $$\frac{1}{100}, \frac{1}{80}, \frac{1}{20}, \frac{1}{16}, \frac{1}{12}, \frac{1}{10}, \frac{1}{8}, \frac{1}{6}, \frac{1.2}{6}, \frac{1.4}{6}$$

have been made. The inclination angles are calculated from the former equation. The $CO_2$ laser light has been transmitted by the silver halide fiber with the connector of the present invention with different inclination.

In eight of ten connectors having the conical surfaces of the oblique rate 1.4/6, the fiber ends have been damaged by the strong $CO_2$ laser light.

In six of ten connectors having the conical surfaces of the oblique rate of 1.2/6, the fiber ends have been damaged.

In three of ten connectors having the conical surface of the oblique rate 1/6, the fiber ends have been damaged.

All ten connectors of the oblique rate of 1/8, 1/10, 1/12, 1/16, 1/20, 1/80 are quite safe despite the strong $CO_2$ laser light.

Nine of ten connectors of the oblique rate of 1/100 are damaged.

Figure 6:
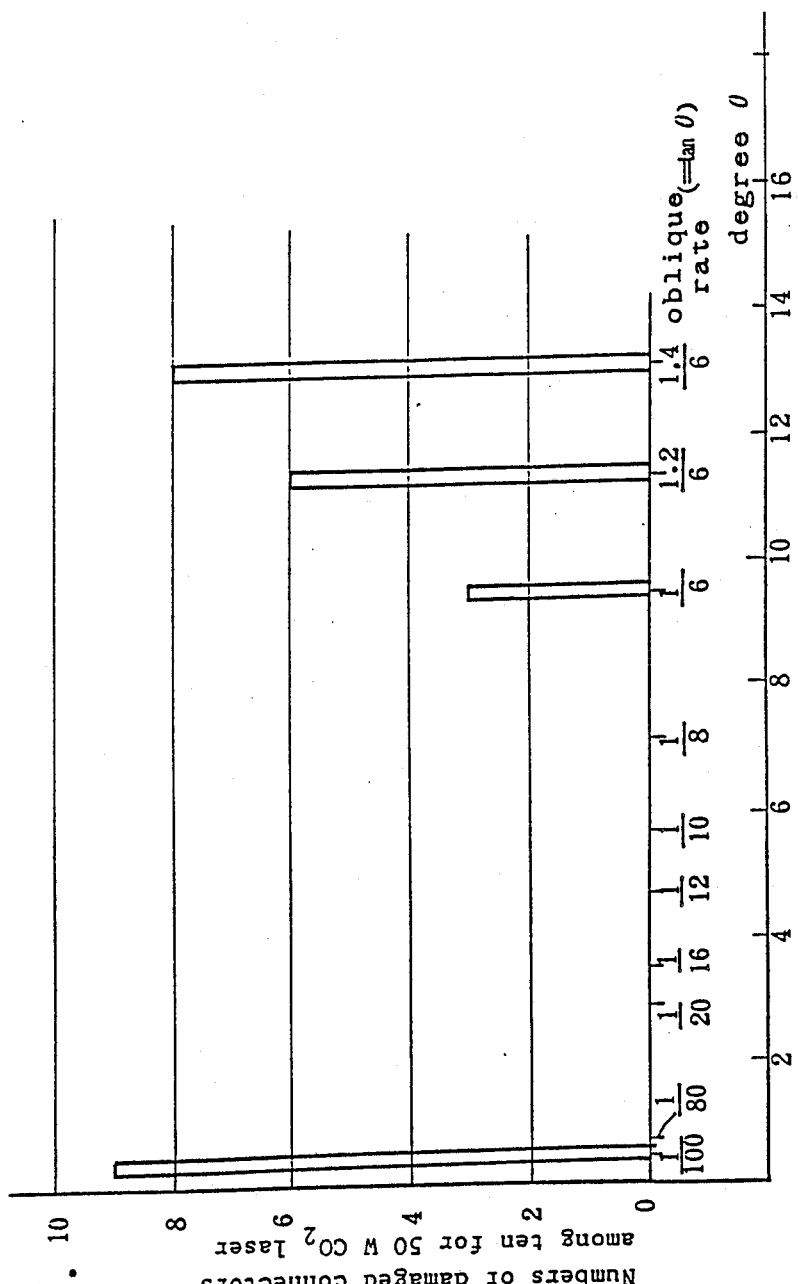
FIG. 6 is a graph showing the oblique rate versus the number of damaged connectors.

From this experiment, the results of which are shown in FIG. 6 it is shown that the optimum range of the oblique rate is from 1/8 to 1/80.

If the oblique rate is smaller than 1/80, the conical surface ($\theta = 0.7°$) is nearly equivalent to a cylindrical surface. Thus the conical surface does not function to stop the fiber end at a correct point along an axial line. Thus the fiber end is located at defocused point for the $CO_2$ laser light.

FIG. 7 shows an optimum location. Focus plane of the $CO_2$ laser is denoted by W. The end of the silver halide fiber is denoted by S. In FIG. 7 W coincides with S. But because the conical surface has weak inclination, less than 1/80, a weak additional force is likely to displace the fiber end S front or back. FIG. 8 shows a defocused state.

The fiber end S deviates forwardly from the focus plane W.

FIG. 9 shows another defocused state. The fiber end S deviates backwardly from the focus plane W.

By this reason the oblique rate, less than 1/80, is inadequate for conical surfaces.

However, the connectors whose oblique rate is more than 1/8 are inadequate also. Fiber ends are likely to be burnt by the strong laser light. This is because an angular misalignment is likely to happen as shown in FIG. 10.

Thus the $CO_2$ laser beam line deviates from the center line of the fiber end. The angular misalignment allows a big leakage of the $CO_2$ laser light near the fiber end.

Too small inclination cannot suppress the axial deviation of fiber end. Too large inclination cannot suppress the angular deviation of fiber end.

Unlike silica fiber the fiber connector of the present invention must transmit a $CO_2$ laser light. $CO_2$ laser has a large power. Trivial deviation of the fiber end leads to damage of fiber end. The $CO_2$ laser light is generally focused by a lens e.g. a ZnSe crystal lens and is launched into a crystalline fiber.

The fiber end must be located exactly at the focus point of the $CO_2$ laser light.

The maximum inner diameter of the cylindrical surface, that is, the inner diameter at the opening end is 26.8 mm.

The tolerance of the inner cylindrical surface (25 mm in diameter) of the receptacle is $+0 \sim -0.05$ mm. The front cylindrical surface (4) of the sleeve (2) is 10 mm in the longitudinal length. The oblique rate of the rear conical surface with regard to the axial line is $\frac{1}{8}-1/80$, preferably 1.8. The maximum diameter of the conical surface, that is, the diameter at the rear end of the surface is 27 mm$\phi$.

The optical fiber connectors of this invention can be used for the optical fiber devices which transmit high power light of $CO_2$ lasers or for the optical fiber devices for precise measurements.

The advantages of the invention will now be explained.

1. The forefront of the sleeve is shaped as a cylindrical surface. The front cylindrical surface fits in the inner cylindrical surface of the receptacle. The cylindrical surfaces adjust the centers of the optical fiber and the receptacle with high accuracy.

The conical surfaces of the sleeve and the receptacle press each other by strong radial forces. Radial displacement of the sleeve is forbidden. The center of the sleeve does not move with regard to the receptacle.

Thus the connection loss of this optical fiber connector is low and stable. This optical fiber connector can be used to transmit a strong light radiated by a powerful $CO_2$ laser.

2. Because external forces induce no radial displacement of the sleeve, this optical fiber connector can be used as a part for precise measurements, in which the light intensity should be measured with high precision. It is because the total loss of the transmission system is stable.

3. The locations of the centers of the sleeve and the receptacle are precisely determined by the fittings of cylindrical surfaces.

While this invention has been described in connection with what is presently considered to be the most practical and preferred embodiment, it is to be understood that the invention is not limited to the disclosed embodiment, but, on the contrary is intended to cover various modifications and equivalent arrangements included within the spirit and scope of the appended claims.

What is claimed is:

1. A connector for optical fibers which transmit intense infrared light comprising:
   a sleeve having an optical fiber hole perforated along a center line in an axial direction, a front cylindrical surface and a rear conical surface formed in coaxial relation with the front cylindrical surface; and
   a receptacle having an inner cylindrical surface to be fitted with the front cylindrical surface of the sleeve and an inner conical surface formed in coaxial relation with the inner cylindrical surface to be fitted with the rear conical surface of the sleeve;
   wherein, when antiparallel forces are applied to the sleeve and the receptacle in the axial direction, the inner conical surface of the receptacle and the inner conical surface of the sleeve press each other with strong forces so that radial displacement of an optical fiber disposed within said optical fiber hole is suppressed; and
   wherein the rear conical surface of the sleeve has an inclination rate in a range from 1/80 to 1/8 and the inner conical surface of the receptacle also has an inclination rate in the range.

2. An optical fiber connector as claimed in claim 1 wherein a small step part is formed between the front cylindrical surface and the rear conical surface of the sleeve and a small step part is formed between the inner conical surface and the inner cylindrical surface of the receptacle.

* * * * *